(12) United States Patent
Hirota et al.

(10) Patent No.: US 6,729,455 B2
(45) Date of Patent: May 4, 2004

(54) STRUCTURE AND METHOD FOR SUPPORTING ELECTROMAGNETIC COUPLING

(75) Inventors: Isao Hirota, Tochigi (JP); Toshikazu Ubagai, Hamamatsu (JP)

(73) Assignees: Tochigi Fuji Sangyo Kabushiki Kaisha (JP); Suzuki Motor Corporation (JP)

(*) Notice: Subject to any disclaimer, the term of this patent is extended or adjusted under 35 U.S.C. 154(b) by 0 days.

(21) Appl. No.: 10/027,901

(22) Filed: Dec. 21, 2001

(65) Prior Publication Data

US 2002/0079179 A1 Jun. 27, 2002

(30) Foreign Application Priority Data

Dec. 27, 2000 (JP) .......................................... 2000-398785

(51) Int. Cl.[7] .......................... F16D 27/115; F16D 13/58
(52) U.S. Cl. ......................... 192/35; 180/381; 180/382; 192/84.7; 192/110 B; 192/115
(58) Field of Search .................. 192/35, 84.7, 110 B, 192/115; 384/581, 582, 536, 586; 180/381, 382

(56) References Cited

U.S. PATENT DOCUMENTS

| | | | | |
|---|---|---|---|---|
| 2,102,415 A | * | 12/1937 | Herreshoff | 384/536 |
| 2,392,832 A | * | 1/1946 | Buckendale | 180/233 |
| 2,893,790 A | * | 7/1959 | Raes et al. | 384/536 |
| 2,897,023 A | * | 7/1959 | Burkhalter et al. | 384/536 |
| 2,962,145 A | | 11/1960 | Diebold | |
| 4,778,026 A | * | 10/1988 | Uchida et al. | 180/381 |
| 5,116,293 A | * | 5/1992 | Reuter | 475/202 |
| 5,145,025 A | * | 9/1992 | Damian | 180/381 |
| 5,188,194 A | * | 2/1993 | Gasch | 180/248 |
| 6,109,408 A | * | 8/2000 | Ikeda et al. | 192/35 |

FOREIGN PATENT DOCUMENTS

| | | |
|---|---|---|
| EP | 856676 A1 | 8/1998 |
| EP | 1002683 A2 | 5/2000 |
| EP | 1002683 A3 | 6/2000 |
| GB | 1461886 | 1/1977 |
| JP | 10-213164 | 8/1998 |

\* cited by examiner

Primary Examiner—Rodney H. Bonck
(74) Attorney, Agent, or Firm—Morrison & Foerster LLP

(57) ABSTRACT

A structure and a method for supporting an electromagnetic coupling (1) onto a vehicle body (347) is disclosed as being interposed between a center support bearing (37) remaining closer to a propeller shaft (319) and a center support bearing (37) remaining closer to a propeller shaft (321). The center support bearings (37, 37) are fixedly mounted to the vehicle body via shock absorbing members (35, 35), respectively.

12 Claims, 4 Drawing Sheets

STRUCTURE AND METHOD FOR SUPPORTING ELECTROMAGNETIC COUPLING

BACKGROUND OF THE INVENTION

The present invention relates to a support structure and a method for supporting an electromagnetic coupling between propeller shafts of a four-wheeled drive vehicle.

Japanese Patent Provisional Publication No. 10-213164 discloses a coupling (i.e. a drive power delivery unit) 501, which is exemplarily shown in FIG. 1.

The coupling 501 is located in a drive power delivery system for rear wheels of the four-wheeled drive vehicle for controlling coupling or uncoupling states of the rear wheels with respect to an engine and controlling the magnitude of drive power to be delivered to the rear wheels.

The coupling 501 is comprised of a rotational case 503, an inner shaft 505, a main clutch 507 of the multi-plate type, a pressure plate 509, an armature 511, an intermediate cam member 513, a first cam 515, a second cam 517, a spring 519, and an electromagnet 521 and a controller (not shown).

The rotational case 503 and the inner shaft 505 are located in a concentric fashion for rotational movement relative to one another, with the inner shaft 505 being disposed inside the rotational case 503.

The rotational case 503 is coupled to a propeller shaft 523 remaining closer to a transfer unit (not shown). Also, the inner shaft 505 is coupled to a propeller shaft 525, remaining closer to a rear differential unit, through a spline connection and is coupled through the propeller shaft 525 to the rear differential unit (which serves to distribute the drive power of the engine to left and right rear wheels).

The pressure plate 509 and the armature 511 are coupled to an inner circumferential periphery of the rotational case 503 through spline connections, respectively.

Further, the intermediate cam member 513 is located between the pressure plate 509 and the armature 511 for rotational movement relative to one another.

The first cam 515 is interposed between the armature 511 and the intermediate cam member 513 and is constructed of cam recesses 527 formed at an outer circumferential periphery of the intermediate cam member 513, and rollers 529 engaging the respective cam recesses 527.

The cam recesses 527 are equidistantly formed on the outer periphery of the intermediate cam member 513 in a circumferential direction, with each recess being shaped in a slanted profile with respect to an axial direction. Also, the rollers 529 are supported with the armature 511 for rotational movement.

The second cam 517 is of a ball cam, which is interposed between the pressure plate 509 and the intermediate cam member 513.

The spring 519 is disposed between the armature 511 and the intermediate cam member 513 to urge the intermediate cam member 513 toward the cam 517 to absorb looseness for thereby improving a response of the cam 517.

Further, in an event that an excitation of the electromagnet 521 is interrupted, the spring 519 serves to restore the armature 511 to its neutral position in a rotational direction to allow the intermediate cam member 513 to be restored to a neutral position in an axial direction, thereby precluding an needless torque from being produced.

Connected to the rotational case 503 is a rotor 531 which forms a magnetic flux path and which is formed with an axially extending annular cavity 535 in which a core 533 of the electromagnet 521 is received with a suitable amount of air gap.

Further, interposed between an outer circumferential periphery of the core 533 and the rotor 531 is a seal 537, with another seal 539 being disposed between an inner circumferential periphery of the core 533 and the inner shaft 505. The seals 537, 539 serve to preclude oil from leaking from the rotational case 503 while preventing entry of water or dusts from outside.

The rotor 531 is formed with axially facing contact surfaces 541 to be brought into contact with the armature 511, with an air gap 543 being formed between the armature 511 and the contact surfaces 541.

The controller serves to control the excitation of the electromagnet 521, an exciting current and an interruption of the excitation of the electromagnet 521.

Upon excitation of the electromagnet 521, a magnetic flux flow loop 545 is created in a magnetic flux path involving the air gap 543, thereby attracting the armature 511.

Upon attraction of the armature 511, the rollers 529 are moved to urge the cam recesses 527 of the intermediate cam member 513 to actuate the first cam 515 by which the intermediate cam member 513 is rotated.

Upon rotation of the intermediate cam member 513, the second cam 517 is actuated to produce a cam thrust force by which the main clutch 507 is urged via the pressure plate 515 and is brought into a coupled condition.

In such a manner, when the electromagnet 521 attracts the armature 511, its pilot function allows the first cam 515 to be operated to actuate the second cam 517 such that the coupling 501 is coupled.

When the coupling 501 is coupled, the drive power of the engine is delivered to the rear wheels to allow the vehicle to be brought into the four-wheeled drive condition, thereby improving a covering property of a rough road and a running stability in a vehicle body.

Further, when the exciting current of the electromagnet 521 is controlled, the cam force of the first cam 515 varies to vary the urging force exerted by the second cam 517, permitting the main clutch 507 to slip for thereby adjusting the drive force to be delivered to the rear wheels. Thus, controlling a drive power distribution ratio between the front and rear wheels allows driveability and operating stability of the vehicle to be improved during a circular traveling of the same.

Upon termination of excitation of the electromagnet 521, the urging force of the spring 519 allows the armature 511 (i.e. the rollers 529) to be restored to the original position such that the cam force of the first cam 515 is lost. When this occurs, the cam thrust force of the second cam 517 also disappears to release the main clutch 507 for thereby uncoupling the coupling 501 such that the vehicle is brought into a two-wheeled drive condition.

The coupling 501 is interposed between the propeller shaft 523, 525 in states exposed to the atmosphere.

In an event where the coupling 501 is located between the propeller shafts 523, 525, there are some instances where, owing to upward or downward movements of the wheels during traveling of the vehicle or the rear wheels riding on stepped portions or convex positions of the rough road during an off-road running condition, the thrust forces are directly imparted to the coupling 501 through the propeller shafts 523, 525, adversely affecting a gap between the outer plates and the inner plates of the main clutch 507 to variably change the air gap 543 between the rotor 531 and the armature 511 with a resultant degraded operating performance and degraded durability caused in the coupling 501.

Also, the presence of the coupling 501 exposed to the outside increases possibilities for the coupling 501 to conflict with obstacles such as flying stones during traveling or to conflict with the stepped portions or the convex portions of the rough road.

As a consequence, the rotational case 503 must have a strength to resist such collisions, with a resultant increase in thickness to have an increased diameter as well as increase in weight.

Also, since the rotational case 503 must have an adequate strength, a difficulty is encountered in the rotational case 503 to be formed with aluminum alloy to reduce the weight.

SUMMARY OF THE INVENTION

It is therefore an object of the present invention to provide a support structure for an electromagnetic coupling which is located on propeller shafts and which is enabled to protect the electromagnetic coupling from conflicting with obstacles, from entry of the obstacles and from being subjected to a thrust force exerted from the propeller shafts.

It is another object of the present invention to provide a method for supporting an electromagnetic coupling onto a vehicle body so as to protect the electromagnetic coupling from conflicting with obstacles, from entry of the obstacles and from being subjected to a thrust force exerted from propeller shafts of a vehicle.

According to a first aspect of the present invention, there is provided a support structure for an electromagnetic coupling located between a first propeller shaft connected to a prime mover and a second propeller shaft connected to wheels of a vehicle, said support structure comprising: a first bearing supporting said first propeller shaft and adapted to be fixedly mounted to a vehicle body; and a second bearing supporting said second propeller shaft and adapted to be fixedly mounted to said vehicle body; wherein said electromagnetic coupling is interposed between said first and second bearings.

In a case where the propeller shaft is divided into two pieces, one for the prime mover and the other for the wheels, since either one of the propeller shafts is located at a slope wherein an end of the propeller shaft closer to the bearing (which remains at a position remotest from the prime mover or the wheels) remains at a higher level than the other end, with a space between the respective propeller shafts having a maximum value in a minimum under-clearance (i.e. a road clearance).

In accordance with the present invention, the electromagnetic coupling is interposed in the above space between the bearings (i.e. the center support bearings) each having the maximum road clearance, with a resultant decrease in the possibilities in conflicting with stepped portions or convex portions of a rough road during an off-road traveling to maintain its normal operating performance.

Further, since the space between the bearings which support the relevant propeller shafts is located in the close proximity to a central area of the vehicle body which minimizes a degree of an adverse affect caused by vibrations of the vehicle body and the propeller shafts.

In addition, although the propeller shaft closer to the wheels encounters rocking movement depending on upward or downward movements of the wheels, the rocking movement is absorbed with a coupling joint mounted at an end of the propeller shaft and is interrupted from being transmitted to the electromagnetic coupling.

With such a structure, the electromagnetic coupling is less suffered from the collision with the obstacles and is protected from being adversely affected with the vibrations of the vehicle body and the propeller shafts as well as the rocking movements of the propeller shafts. This results in a minimum displacement in a distance between the outer plates and the inner plates of the clutch and an air gap between the core and the rotor, which forms a part of a magnetic flux path of the core, providing a stable operating stability and an increased durability.

Also, since the electromagnetic coupling has a reduced degree of vibration and is close to the vehicle body, it is easy for the lead wires of the electromagnet to be pulled out, and a disconnection of the lead wires is minimized.

According to a second aspect of the present invention, there is provided a method of supporting an electromagnetic coupling on a vehicle body of a vehicle, said method comprising: locating said electromagnetic coupling between a first propeller shaft connected to a prime mover and a second propeller shaft connected to wheels of a vehicle; supporting said first propeller shaft with a first bearing; supporting said second propeller shaft with a second bearing; supporting said electromagnetic coupling between said first and second bearings; and fixedly mounting said first and second bearings onto said vehicle body.

Other aspect and advantages of the invention will become more apparent from the following description, taken in conjunction with the accompanying drawings, illustrating by way of example the principles of the invention.

DETAILED DESCRIPTION OF THE PREFERRED EMBODIMENTS

An electromagnetic coupling 1 with its support structure of a preferred embodiment according to the present invention to carry out a method of the present invention will be described in detail with reference to FIGS. 2 to 4.

Figure 1:
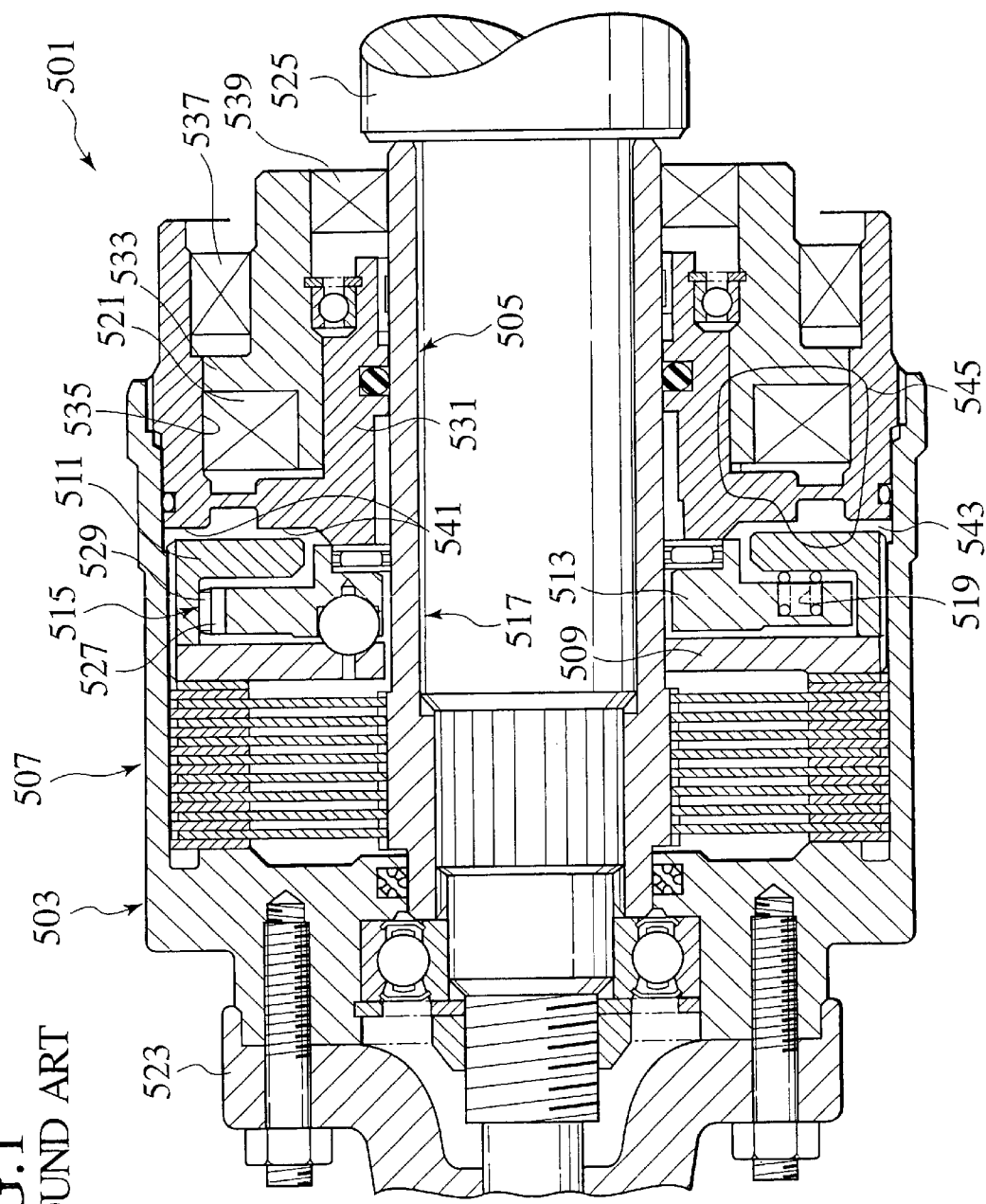
FIG. 1 is a cross sectional view of a coupling unit according to the related art.
Figure 2:
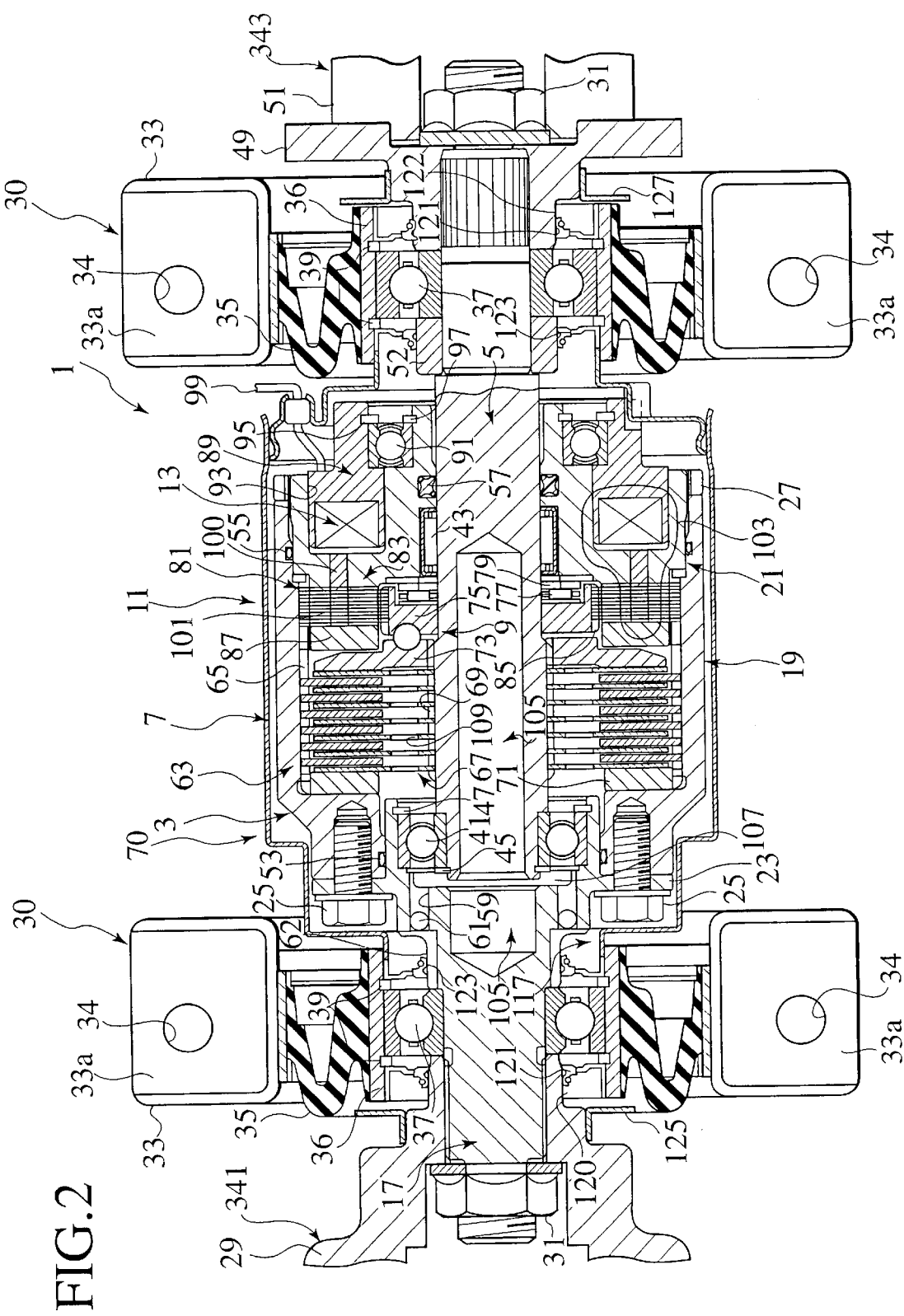
FIG. 2 is a cross sectional view of a support structure for an electromagnetic coupling of a preferred embodiment according to the present invention to carry out a method of the present invention.
Figure 3:
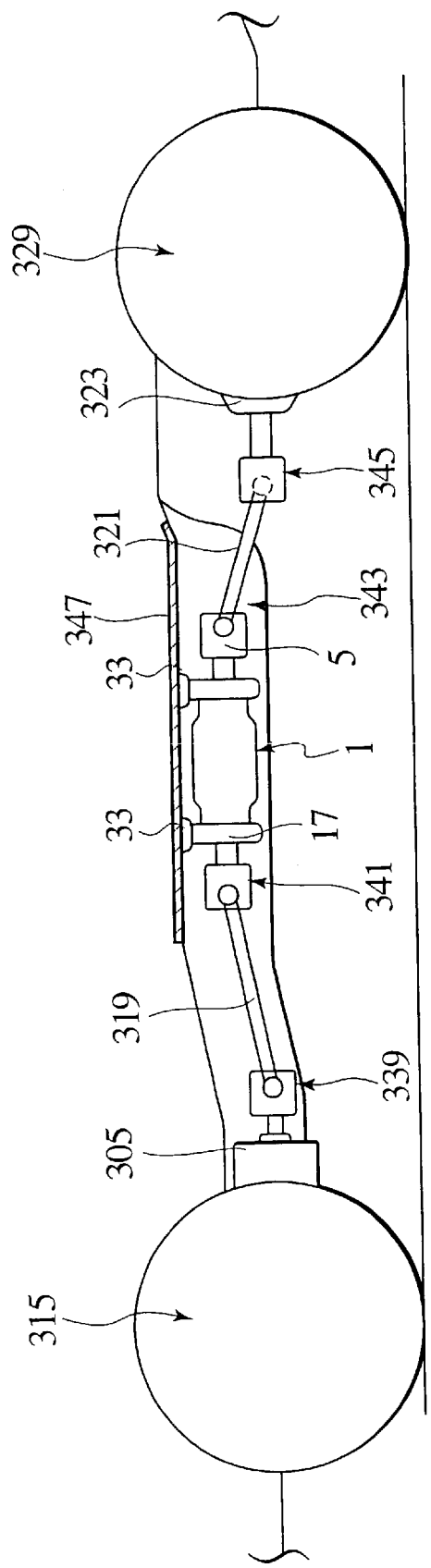
FIG. 3 is a skeleton mechanical view illustrating a power drive system of a vehicle employing the support structure for the electromagnetic coupling of the preferred embodiment shown in FIG. 2.
Figure 4:
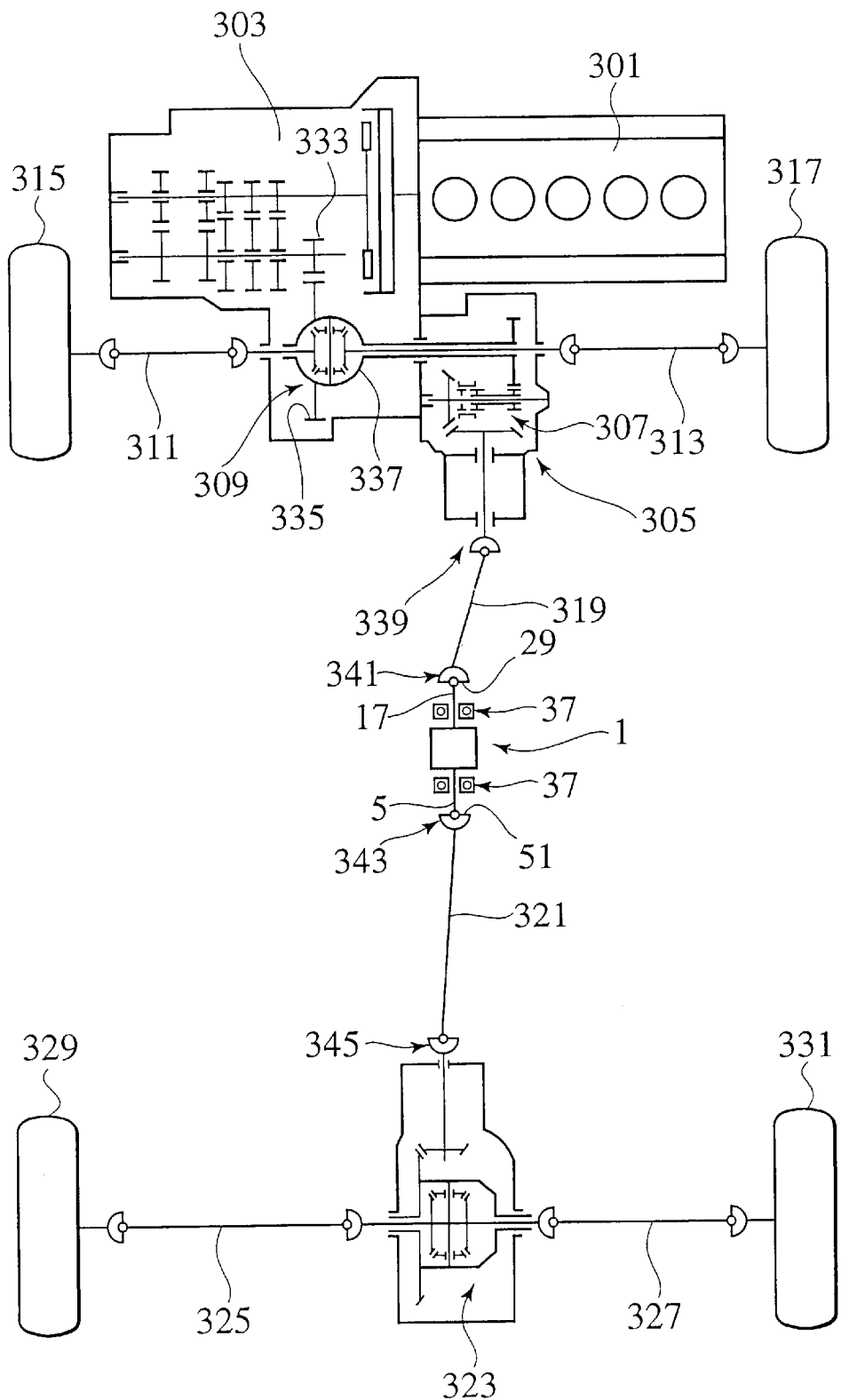
FIG. 4 is a schematic plan view illustrating a part of the power drive system of the vehicle employing the support structure for the electromagnetic coupling of the preferred embodiment shown in FIG. 2.

FIG. 2 shows the electromagnetic coupling 1, and FIGS. 3 and 4 show a drive system for a four-wheeled drive vehicle using the electromagnetic vehicle 1. Also, a left and right direction in FIG. 4 refers to a left and right direction of the vehicle, and the left direction in FIGS. 2 and 3 corresponds to a front area of the four-wheeled vehicle.

The drive system shown in FIGS. 3 and 4 is comprised of an engine (i.e. a prime mover) 301 of a transverse type, a transmission 303, a transfer unit 305, a 2–4 changeover mechanism 307 internally disposed in the transfer unit 305, a front differential 309 (i.e. a differential unit which distributes a drive power from the engine to left and right front wheels), front wheel shafts 311, 313, the left and right front wheels 315, 317, a front side propeller shaft (i.e. a propeller shaft remaining close proximity to the prime mover) 319, the electromagnetic coupling 1, a rear side propeller shaft (i.e. a propeller shaft remaining close proximity to rear wheels) 321, a rear differential 323, rear wheel shafts 325, 327, and the left and right rear wheels 329, 331.

The drive power of the engine 301 is delivered to the transmission 303 wherein the drive power is passed through an output gear 333 to a ring gear 335, through which the drive power is delivered to a differential case 337 of the front differential 309 from which the drive power is distributed to the front wheels 315, 317 via the front wheel shafts 311, 313.

Further, when the 2–4 changeover mechanism 307 is coupled, rotation of the differential case 337 allows the front side propeller shaft 319 to be driven via the transfer unit 305 and a coupling joint 339, with a rotational power being delivered through a coupling joint 341 to the electromagnetic power 1.

When the electromagnetic coupling 1 is activated, the drive power of the engine 301 is delivered through a coupling joint 343, the rear side propeller shaft 321 and a coupling joint 345 to the rear differential 323, from which the drive power is distributed to the rear wheels 329, 331 via the rear wheel shafts 325, 327 to allow the vehicle to be maintained in a four-wheeled drive condition.

Further, an uncoupling operation of the electromagnetic coupling 1 allows the rear side propeller shaft 321 and its downstream component parts to be uncoupled to compel the vehicle to be maintained in a two-wheeled drive condition.

In this manner, the electromagnetic coupling 1 is disposed between the front and rear side propeller shafts 319, 321 of the four-wheeled vehicle, enabling the rear wheels 329, 331 to be coupled to or uncoupled from the engine 301 and to be delivered with controlled power output.

As seen in FIG. 2, the electromagnetic coupling 1 is constructed of a rotational case (i.e. one rotary member) 3, an inner shaft (i.e. the other rotary member) 5, a main clutch 7 of a multi-plate type, a ball cam 9, a pilot clutch 11, an electromagnet 13 and a controller (not shown).

The rotational case 3 includes a front side power delivery shaft 17 made of steel material for the shaft, a cylindrical member 19 made of aluminum alloy (non-magnetic material), and a rear side rotor 21 made of iron alloy (magnetic material).

The power delivery shaft 17 is formed with a flange segment 23, which is fixed to one opening portion of the cylindrical member 19 by means of bolts 25.

The rotor 21 is screwed into and fixed to another opening portion of the cylindrical member 19 and secured in fixed place by means of nuts 27 with their double-nut function.

The power delivery shaft 17 is connected through a splined portion to a joint fork 29 of the coupling joint 341 and is fixed thereto by a bolt 31. As noted above, the drive power of the engine 301 rotates the power delivery shaft 17 via the propeller shaft 319 and the coupling joint 341.

As viewed in FIGS. 2 and 3, further, the electromagnetic coupling 1 is fixedly mounted to a vehicle body through a pair of front and rear center support members 30, 30 by means of front and rear mounting fixtures 33, 33, respectively, secured to a floor panel 347 of the vehicle body. The power delivery shaft 17 is supported with the vehicle body by means of the front center support member 30 (as viewed in a front area in FIG. 2). The front center support member 30 includes a front flexible support member (which serves as a shock-absorbing member) 35, a front annular support member 36 and a front center support bearing 37.

The front support bearing 37 is located in an inner diameter wall of the front annular support member 36 and is held in abutting engagement with the front annular support member 36 to be positioned in a radial direction, with snap rings 39, 39 being fixed in the front annular support member 36 to compel the same to position the front center support bearing 37 in an axial direction. In addition, the front center support bearing 37 is sandwiched between the power delivery shaft 17 and the joint fork 29 and is fixed to the power delivery shaft 17.

Also, the front flexible support member 35 is located on the front annular support member 36 between an outer periphery thereof and an inner periphery of the front mounting fixture 33 and has a shape which is so curved in the axial direction as to surround the front annular support member 36.

The front mounting fixture 33 is formed in a shape which surrounds the front flexible support member 35 in a circumferential direction and has at its both ends formed with mounting walls 33a, 33a, formed with respective mounting bores 34, 34, through which bolts (not shown) extend to fixedly secure the flexible support member 35 to the floor panel 347 such that the flexible support member 35 is supported from the floor panel 347.

Likewise, the rear center support member 30 has the same structure as the front center support member 30 and includes the same component parts bearing the same reference numerals as those of the front center support member 30, with a detailed description of the same being herein omitted for the sake of simplicity of description. However, the rear center support member 30 supports a rear distal end of the inner shaft 5 for rotational movement.

The inner shaft 5 is inserted through the rotational case 3 in a rearward direction. A front end of the inner shaft 5 is supported with the power delivery shaft 17 by means of a bearing 41 and a rear end thereof is supported with the rotor 21 by means of a needle bearing 43. Also, the inner shaft 5 is positioned with respect to the rotational case 3 in the axial direction by means of a snap ring 45, the ball bearing 45 and a snap ring 47.

The rear distal end of the inner shaft 5 is connected to a companion flange 49 via a spline connection and is fixed thereto by a bolt 31. Connected to the companion flange 49 is a joint fork 51 of the coupling 343, with the companion flange 49 being positioned in the axial direction by means of a spacer 52.

On the other hand, the power delivery shaft 17 is supported with the vehicle body by means of the rear center support member 30 (as viewed in a rear area in FIG. 2). The rear center support member 30 includes a rear flexible support member (which serves as a shock-absorbing member) 35, a rear annular support member 36 and a rear center support bearing 37.

The rear support bearing 37 is located in an inner diameter wall of the rear annular support member 36 and is held in abutting engagement with the rear annular support member 36 to be positioned in a radial direction in the same manner as discussed above, with snap rings 39, 39 being fixed in the rear annular support member 36 to compel the same to position the rear center support bearing 37 in an axial direction. In addition, the rear center support bearing 37 is sandwiched between the companion flange 49 and a spacer 52 and is fixed to the inner shaft 5.

Also, a pair of lip seals 121, 123 are located on front and rear sides of the front center support bearing 37 which supports the power delivery shaft 17. The lip seal 121 is located between a boss portion 120 of the joint fork 29 of the coupling joint 341 and the front annular support member 36, and the lip seal 123 is located between the power delivery shaft 17 and the front annular support member 36.

Further, the pair of lip seals 121, 123 are located on rear and front sides of the rear center support bearing 37 which supports the inner shaft 5. The lip seal 121 is located between the spacer 52 and the rear annular support member 36, and the lip seal 123 is located between a boss portion 122 of the companion flange 49 and the rear annular support member 36.

Grease is sealed between the respective lip seals 121, 123 to allow the respective center support bearings 37, 37 to be lubricated and cooled.

Also, front and rear dust covers 125, 127 are mounted to the respective boss portions 120, 122 of the joint fork 29 and the companion flange 49, respectively, for protecting the lip seals 121, 121 from stepping-stones, etc.

Further, a cover member 70 is located outwardly of the rotational case 3 with a view to protecting entry of substances into the electromagnetic coupling 1. The cover member 70 conceals the rotational case 3 and the electromagnet 13, with front and rear ends of the cover member 70 being fixed to the aforementioned front annular support member 36.

An O-ring 53 is disposed between the cylindrical member 19 of the rotational case 3 and the power delivery shaft 17, and an O-ring 55 is disposed between the cylindrical member 19 and the rotor 21. Also, an X-ring 57 with an X-shape in cross section is disposed between the rotor 21 and the inner shaft 5. Thus, the rotational case 3 of the electromagnetic coupling 1 is held in a sealed condition with the O-rings 53, 55 and the X-ring 57.

The rotational case 3, which is sealed, is filled with oil which is supplied through an oil port 59 formed at the flange segment 23 of the power delivery shaft 17, with the oil port 59 being sealed with a check ball 61 press fitted to the oil port 59 after oil is supplied thereto. Moreover, a cutout recess 62 is formed in the flange segment 23 at a position opposed to the oil port 59 to provide an oil delivery path.

The main clutch 7 is located between the rotational case 3 and the inner shaft 5, with multiple outer plates 63 being coupled to a splined portion 65 formed at an inner circumferentially of the rotational case 3 while multiple inner plates 67 being coupled to a splined portion 69 formed at an outer circumferential periphery of the inner shat 5. Also, located at a left side of the main clutch 7 is a pressure receiver ring 71, whose outer circumferential periphery is coupled to the splined portion 65.

The ball cam 9 is located between a pressure plate 73 and a cam ring 75.

The pressure plate 73 has an inner circumferential periphery coupled to the splined portion 69 of the inner shaft 5 to allow the main clutch 7 to be urged against the rotational case 3, i.e. the pressure receiver ring 71 through a thrust force imparted from the ball cam 9 to be brought into a coupled condition.

The cam ring 75 is located around the outer circumferential periphery of the inner shaft 5. A thrust bearing 75 and a washer 79 are interposed between the cam ring 75 and the rotor 21 to bear a cam reaction force imparted from the ball cam 9.

The pilot clutch 11 is interposed between the rotational case 3 and the cam ring 75. The pilot clutch 11 includes outer plates 81 which are coupled to the splined portion 65 of the rotational case 3, and inner plates 83 which are coupled to a splined portion 85 formed at an outer circumferential periphery of the cam ring 75.

Interposed between the pilot clutch 11 and the pressure plate 73 is an armature 87 which has an outer circumferential periphery coupled to the splined portion 65 of the rotational case 3.

A core 89 of the electromagnet 13 is supported on the rotor 21 by means of a sealed type bearing 89 and is received in an annular cavity 93 axially formed in the rotor 21 with a suitable air gap. Further, the core 89 is positioned in an axial direction with respect to the rotor 21 by means of a snap ring 95, the ball bearing 91 and a snap ring 97, with rotational movement of the core 89 being interrupted with respect to the vehicle body by means of the cover member 70 fixed to the annular support member 36.

Lead wires 99 of the electromagnet 13 are coupled to a battery (not shown) of the vehicle.

Further, a magnetic flux path of the electromagnet 13 is formed with the rotor 21, the pilot clutch 11 and the armature 87.

The rotor 21 is divided into an inner member 21a and an outer member 21b by means of an annular ring 100 made of non-magnetic stainless steel. Each of the plates 81, 83 of the pilot clutch 11 is formed with a plurality of circumferentially spaced cutouts 101 and bridge areas for interconnecting these cutouts at a circumferential area corresponding to the ring 100 in a radial direction. With such a ring 100 and the cutouts 101, a short-circuiting of a magnetic flux path is avoided.

The controller (not shown) is so arranged as to perform exciting of the electromagnet 13, control of exciting current and interrupting excitation of the electromagnet 13.

Upon excitation of the electromagnet 13, a magnetic flux loop 103 is created in the magnetic flux path, attracting the armature 87 to urge the pilot clutch 11 into a coupled state to produce a pilot torque.

Upon receipt of the pilot torque, the drive power of the engine 301 is applied through the rotational case 3, the pilot clutch 11 and the cam ring 75 to the ball cam 9. When this occurs, the cam thrust force is created to allow the main clutch 7 to be urged with the pressure plate 73 to be brought into a coupled state such that the electromagnetic coupling 1 is brought into the coupled condition.

Upon coupling of the electromagnetic coupling 1, the drive power of the engine 301 is delivered through the inner shaft 5 and the propeller shaft 321 to the rear differential 323, through which the drive power if further distributed to the left and right rear wheels 329, 331 to provide the four-wheeled drive condition of the vehicle for thereby providing an improved rough-road covering property and an improved stability in the vehicle body during a driving condition of the vehicle.

During such a condition, when the controller operates to adjust an exciting current to control the magnitude of the magnetic flux density to be produced by the electromagnet 13, slippage will occur in the pilot clutch 11 to vary the pilot torque for varying the thrust force of the ball cam 9, enabling the coupling force of the main clutch 7, i.e. the electromagnetic coupling 1 to be variably adjusted.

With such an adjustment of the coupling force of the electromagnetic coupling 1, it is possible for a distribution ratio of the drive power between the front and rear wheels to be arbitrarily controlled, with a resultant improvement in driveability and a stability of the vehicle during a circular running condition of the vehicle.

Also, upon termination of the excitation of the electromagnet 13, the pilot clutch 11 is released to cause the thrust force of the ball cam 9 to disappear, releasing the main clutch 7 to uncouple the electromagnetic coupling 1.

Upon uncoupling of the electromagnetic coupling 1, the rear differential 323 is separated from the engine and the vehicle is brought into the two-wheeled, front drive condition.

When this takes place, further, the coupling state of the 2–4 changeover mechanism 307 is released in association with the electromagnetic coupling 1. Under this circumstance, rotations of the 2–4 changeover mechanism 307, the coupling 341 and associated components parts are interrupted to remarkably reduce noises, vibrations and wears, etc. with a resultant improvement in fuel consumption of the engine 301.

Further, locating hub clutches between the rear wheel shafts 325, 327 and the rear wheels 329, 331, respectively, to release respective coupling conditions in association with the electromagnetic coupling 1 allows a power delivery line covering from the electromagnetic coupling 1 to the rear wheels 329, 331 to be interrupted both from rotation of the engine 301 and accompanied rotations of the rear wheels 329, 331, with a significant reduction in noises, vibrations, wears, etc. to further improve the fuel consumption of the engine 301.

In addition, the presence of the rotational case 3 made of aluminum alloy is effective for preventing the magnetic fluxes of the electromagnet 13 to be leaked outside the rotational case 3 to allow the magnetic force of the armature 87 to be effectively conducted to cause the pilot clutch 11 to provide a given pilot torque for thereby permitting the electromagnetic coupling 1 to provide a given coupling torque.

As previously discussed above, further, oil sealed in the rotational case 3 which is sealed is retained in an oil sump 105 which is formed in areas of the inner shaft 5 and the power delivery shaft 17. Upon rotation of the inner shaft 5, oil remaining in the oil sump 105 is subjected to a centrifugal force. When this occurs, oil is forced to flow through an oil flow passage 107 formed between the front distal end of the inner shaft 5 and the rotational case 3 into the bearing 41, the main clutch 7, the ball cam 9, the bearings 77, 43 and the pilot clutch 11, which are consequently lubricated and cooled.

Furthermore, oil apertures 109 are formed in the inner plates 67 of the main clutch 7, respectively, to promote movement of oil toward the ball cam 9, the bearings 77, 43 and the pilot clutch 11 to improve lubricating and cooling effects of the same.

As viewed in FIG. 3, also, since the propeller shaft 319 and the propeller shaft 321 located on front and rear sides of the electromagnetic coupling 1 are inclined such that the rear and front distal ends of the propeller shafts 319, 321 remain at a higher level in the vicinity of the electromagnetic coupling 1, with the electromagnetic coupling 1 being located at the uppermost position with respect to a ground clearance (i.e. road clearance).

Further, since both rotary members of the electromagnetic coupling 1 are supported with the vehicle body via the respective bearings and shock absorbing members, even when the wheels encounter the upward or downward movements during the traveling or the collisions with the stepped portions or the convex portions of the rough road during the off-road traveling, the thrust force and the impact shock are enabled to be effectively absorbed with the aforementioned shock absorbing members. Also, the rocking movement of each propeller shaft is absorbed with each coupling, it is possible for the variations in the air gap between the core of the electromagnet and the rotor and the distance between the plates of the clutch to be reliably precluded, resulting in an improved operating performance and an increased durability.

In such a manner, the electromagnetic coupling 1 and its support structure is constructed.

As noted above, since the electromagnetic coupling 1 is interposed between the center support bearings 37, 37 remaining at the maximum road clearance, there are few chances for the electromagnetic coupling 1 to conflict with stepped level portions or convex portions of the road during an off-road traveling condition of the vehicle.

Further, although the propeller shaft 321 is subjected to rocking movement in response to upward or downward movements of eh rear wheels 329, 331, this rocking movement is absorbed with the coupling joints 343, 345 of the propeller shaft 321 and is interrupted from the electromagnetic coupling 1.

In addition, the mounting space located between the center support bearings 37, 37 in close proximity to the central portion of the vehicle body bears a minimum adverse affect caused by swaying movement of the vehicle body and the swaying movements of the propeller shafts 319, 319.

Also, since the rotational case 3 and the inner shaft 5 of the electromagnetic coupling 1 is supported with the vehicle body via the flexible support member 35 and the center support bearing 37, respectively, even when the rear wheels 329, 331 are subjected to upward or downward movements during traveling of the vehicle to cause the rear wheels 329, 331 to conflict the stepped portions or the convex portions of the road during the off-road driving condition, the thrust force and impact shocks are born with the flexible support member 35 with its vibration absorbing function. Especially, in the illustrated preferred embodiment, since the flexible support member 35 is so located between the annular support member 36 and the mounting fixtures 33 at an outer diametrical side of the annular support member 36 as to have the axially curved profile which surrounds the annular support member 36, it has a favorable vibration absorbing function with a resultant decrease in adverse affect of the vibration on the electromagnetic coupling 1.

Thus, since the electromagnetic coupling 1 is free from conflicting with obstacles and is not adversely affected with the vibrations of the propellers shafts 319, 321 and the rocking movement and the thrust force of the propeller shaft 321, varying displacements are avoided to occur in a distance between the respective plates 63, 67 of the main clutch 7, a distance between the respective plates 81, 83 of the pilot clutch 11 and an air gap between the core 89 of the electromagnet 13 and the rotor 21, maintaining stable operating performances with an increased durability.

Furthermore, the presence of the cover member 70 for protecting the electromagnetic coupling 1 from being sacrificed with obstacles allows the electromagnetic coupling 1 to be protected from entry of dusts, muddy water and the stepping stones. Consequently, it is possible for the obstacles from entering the gap between the core 89 of the electromagnet 13 and the rotor 21, with a resultant increase in a durability and reliability of the electromagnetic coupling 1.

In addition, since the cover member 70 is mounted to the electromagnetic coupling 1 using the existing center support members 30, 30, front and rear opening portions of the cover member 70 are arranged to be closed using the center support members 30, 30 to simplify a structure of the cover member 70 with an ease for providing a protection for the electromagnetic coupling 1.

Also, since the electromagnetic coupling 1 undergoes a few sway and is located at the area with a small distance relative to the vehicle body, it is easy for the lead wires 99 of the electromagnet 13 to be treated with less opportunity in disconnection.

In the illustrated embodiment discussed above, further, the main clutch and the pilot clutch are not limited to the multi-plate type clutches and may be comprised of friction type clutches such as cone-clutches or may be composed of other types of clutches.

It will now be appreciated from the foregoing description that the support structure for the electromagnetic coupling of the present invention, as defined in claim 1, the provision of the electromagnetic coupling located between the bearing of the propeller shaft closer to the prime mover and the bearing of the propeller shaft closer to the rear wheels compels the electromagnetic coupling 1 to have the maximum value in the road clearance to eliminate fears in that the electromagnetic coupling 1 conflicts with the stepped portions or the convex portions of the road during the off-road traveling condition. Thus, it is possible for the electromagnetic coupling 1 to have a proper operating function in a prolonged period of time.

Further, the electromagnetic coupling which is located in the close proximity to the central area of the vehicle body is hard to be adversely affected with the swaying movements of the vehicle body and the propeller shafts. Also, since the rocking movements of the propeller shafts are absorbed with the associated coupling joints, the rocking movement is not transferred to the electromagnetic coupling. Therefore, varying displacements become small in the air gap between the core of the electromagnet and the rotor and in the distances among the places of the clutch, with a further improved stability in operating performance.

Also, since the electromagnetic coupling encounters a small amount of swaying movement and is disposed in the position closer to the vehicle body, it is easy for the lead wires to be pulled out such that the disconnection is hard to occur.

What is claimed is:

1. A support structure for an electromagnetic coupling located between a first propeller shaft connected to a prime mover and a second propeller shaft connected to wheels of a vehicle, said electromagnetic coupling comprising a first rotary member, a second rotary member and an electromagnet, said support structure comprising:

a first bearing supporting said first propeller shaft and said first rotary member, and adapted to be fixedly mounted to a vehicle body wherein said first bearing is sandwiched between said first propeller shaft and said first rotary member;

a second bearing supporting said second propeller shaft and said second rotary member, and adapted to be fixedly mounted to said vehicle body;

a third and fourth bearings supporting said first rotary member on said second rotary member; and a fifth bearing supporting said electromagnet on said first rotary member;

wherein said electromagnetic coupling is interposed between said first and second bearings.

2. The support structure for an electromagnetic coupling according to claim 1, further comprising:

a first shock absorbing member supporting said first bearing on a vehicle body of said vehicle; and a second shock absorbing member supporting said second bearing on said vehicle body.

3. The support structure for an electromagnetic coupling according to claim 1, further comprising:

first and second center support members supporting said first and second bearings on said vehicle, respectively; and a cover member enclosing said electromagnetic coupling and fixedly connected to said first and second center support members.

4. A support structure for an electromagnetic coupling located between a first propeller shaft connected to a prime mover and a second propeller shaft connected to wheels of a vehicle, said electromagnetic coupling comprising a first rotary member, a second rotary member and an electromagnet, said support structure comprising:

a first bearing supporting said first propeller shaft and said first rotary member, and adapted to be fixedly mounted to a vehicle body;

a second bearing supporting said second propeller shaft and said second rotary member, and adapted to be fixedly mounted to said vehicle body;

a third and fourth bearings supporting said first rotary member on said second rotary member;

a fifth bearing supporting said electromagnet on said first rotary member, wherein said electromagnetic coupling is interposed between said first and second bearings;

first and second center support members supporting said first and second bearings on said vehicle, respectively; and a cover member enclosing said electromagnetic coupling and fixedly connected to said first and second center support members and wherein:

said first and second center support members comprise first and second annular support members supporting said first and second bearings, respectively, first and second shock absorbing members supporting said first and second bearings via said first and second annular support members, respectively, and first and second mounting fixtures supporting said first and second shock absorbing members on a floor panel of said vehicle.

5. The support structure for an electromagnetic coupling according to claim 4, wherein:

each of said first and second bearings is disposed in an inner circumferential periphery of each of said first and second annular support members in intimate engagement therewith to be positioned in a radial direction, said each bearing being positioned in an axial direction by a snap ring fixed to said each annular support member.

6. The support structure for an electromagnetic coupling according to claim 5, wherein:

said first propeller shaft comprises a joint fork; and said electromagnetic coupling comprises a power delivery shaft; and wherein said first bearing is interposed between said joint fork and said power delivery shaft.

7. The support structure for an electromagnetic coupling according to claim 4, wherein:

each of said first and second shock absorbing members is disposed between an outer circumferential periphery of each of said first and second annular support members and each of said first and second mounting fixtures, said each shock absorbing member having an axially curved shape which surrounds said each annular support member.

8. The support structure for an electromagnetic coupling according to claim 4, wherein:

each of said first and second mounting fixtures has a shape surrounding said each shock absorbing member in a circumferential direction and has both ends formed with mounting walls, respectively, each of which has a mounting bore through which a bolt is inserted to be fixed to said floor panel of said vehicle for thereby fixedly supporting said each shock absorbing member on said floor panel.

9. The support structure for an electromagnetic coupling according to claim 4, wherein said electromagnetic coupling comprises a rotational case and an electromagnet; and wherein said cover member encloses said rotational case and said electromagnet and has front and rear distal ends fixedly connected to said first and second annular support members.

10. The support structure for an electromagnetic coupling according to claim 9, wherein:

said rotational case is made of aluminum alloy.

11. The support structure for an electromagnetic coupling according to claim 4, wherein:

said first and second propeller shafts remain in respective inclined states to support said electromagnet coupling at an uppermost area to provide a maximum road clearance.

12. A method of supporting an electromagnetic coupling on a vehicle body of a vehicle, said electromagnetic coupling comprising a first rotary member, a second rotary member, and an electromagnet, said method comprising:

locating said electromagnetic coupling between a first propeller shaft connected to a prime mover and a second propeller shaft connected to wheels of a vehicle;

supporting said first propeller shaft and said first rotary member with a first bearing wherein said first bearing is sandwiched between said first propeller shaft and said first rotary member;

supporting said second propeller shaft and said second rotary member with a second bearing;

supporting said first rotary member on said second rotary member with a third and fourth bearings;

supporting said electromagnet on said first rotary member with a fifth bearing;

supporting said electromagnetic coupling between said first and second bearings; and fixedly mounting said first and second bearings onto said vehicle body.

* * * * *